United States Patent
Cheng

(10) Patent No.: US 10,321,067 B2
(45) Date of Patent: Jun. 11, 2019

(54) DETECTION SYSTEM AND METHOD

(71) Applicant: TCTM (HONG KONG) LIMITED, Taoyuan (TW)

(72) Inventor: Hwang-cheng Cheng, Taoyuan (TW)

(73) Assignee: TCTM (HONG KONG) LIMITED, Luzhu Dist. (TW)

(*) Notice: Subject to any disclaimer, the term of this patent is extended or adjusted under 35 U.S.C. 154(b) by 106 days.

(21) Appl. No.: 15/486,182

(22) Filed: Apr. 12, 2017

(65) Prior Publication Data

US 2018/0302546 A1 Oct. 18, 2018

(51) Int. Cl.
| | |
|---|---|
| *H04N 5/00* | (2011.01) |
| *H04N 5/235* | (2006.01) |
| *H04N 5/225* | (2006.01) |
| *H04N 5/232* | (2006.01) |

(52) U.S. Cl.
CPC ......... *H04N 5/2354* (2013.01); *H04N 5/2256* (2013.01); *H04N 5/23222* (2013.01)

(58) Field of Classification Search
CPC . H04N 5/2354; H04N 5/2256; H04N 5/23222
See application file for complete search history.

(56) References Cited

U.S. PATENT DOCUMENTS

| | | | | |
|---|---|---|---|---|
| 6,331,133 | B1* | 12/2001 | Katayama | B24B 3/26 451/10 |
| 6,491,417 | B1* | 12/2002 | Haen | B60Q 1/0023 250/330 |
| 2008/0212027 | A1* | 9/2008 | Shimizu | A61B 3/14 351/206 |
| 2010/0242693 | A1* | 9/2010 | Akiyama | B23Q 17/09 82/118 |
| 2015/0009677 | A1* | 1/2015 | Catalano | H05B 33/0845 362/296.07 |
| 2015/0066411 | A1* | 3/2015 | Blanton | G01B 11/2518 702/82 |

* cited by examiner

*Primary Examiner* — Zhihan Zhou

(57) ABSTRACT

A detection system include a light source including three or more than three equiangularly spaced light-emitting devices for emitting light onto multiple cutting edges of a cutter blade of a cutter, a camera for capturing images of the cutting blade of the cutter, and a controller electrically coupled with the light source and the camera and capable of figuring out the angle of the cutter blade of the cutter by analyzing the images of the cutter blade and then controlling one specific light-emitting device to emit light onto the cutter blade of the cutter.

2 Claims, 5 Drawing Sheets

```
┌─────────────────────────────────────────────┐
│ Place handle of cutter in cutter holder to  │
│ align cutter blade with opening of light    │──100
│ source so that multiple cutting edges of    │
│ cutter blade of the cutter can face         │
│ toward light-emitting devices               │
└─────────────────────────────────────────────┘
                      │
┌─────────────────────────────────────────────┐
│ Enable controller to drive light-emitting   │
│ devices and camera, causing light-emitting  │
│ devices to emit light onto cutting edges    │──101
│ of cutter blade of the cutter and camera    │
│ to capture images of cutting edges and to   │
│ transmit captured images to controller      │
└─────────────────────────────────────────────┘
                      │
┌─────────────────────────────────────────────┐
│ Enable controller to figure out the angle   │
│ of cutter blade by analyzing the images     │
│ received from camera and then controlling   │
│ light-emitting devices to emit light, where │──102
│ the angle of cutter blade is an angle       │
│ relative to one specific light-emitting     │
│ device, i.e., controller figures out which  │
│ light-emitting device is disposed closest   │
│ to cutting edges by analyzing received      │
│ images, and then enable that light-emitting │
│ device                                      │
└─────────────────────────────────────────────┘
                      │
┌─────────────────────────────────────────────┐
│ Enable camera to take the picture of cutter │
│ blade again and to transmit captured        │──103
│ picture to sensor for inspection            │
└─────────────────────────────────────────────┘
```

Fig.5

DETECTION SYSTEM AND METHOD

BACKGROUND OF THE INVENTION

1. Field of the Invention

The present invention relates to cutter detection technology and more particularly, to a detection system and method, which enables multiple cutting edge of a cutter to create a significant contrast between light and shadow so that the picture of the cutter captured by a camera can be accurately analyze by a sensor, increasing the accuracy of the detection.

2. Description of the Related Art

After the production of a drill, end mill or any other cutter, a charge coupling device (CCD) is normally used to detect the shape characteristics of the cutting edge. In order to make the detection results more accurate, a light source will be used to emit light onto the cutting edge of the drill, end mill or cutter, making the profile of the cutting edge clearer. This method is can actually enhance the accuracy of the detection when detecting a cutter having one single cutting edge. However, when detecting a cutter having multiple cutting edges, the area around the intersection (static) between two cutting edges will be too bright and cannot be accurately detected.

SUMMARY OF THE INVENTION

The present invention has been accomplished under the circumstances in view. It is therefore the main object of the present invention to provide a detection system, which enables multiple cutting edge of a cutter to create a significant contrast between light and shadow so that the picture of the cutter captured by a camera can be accurately analyze by a sensor, increasing the accuracy of the detection.

To achieve this and other objects of the present invention, a detection system comprises a light source adapted for emitting light onto multiple cutting edges of a cutter blade of a cutter, a camera adapted for capturing images of the cutting edges, and a controller electrically coupled with the light source and the camera. The light source comprises at least three equiangularly spaced light-emitting devices. The controller is capable of figuring out the angle of the cutting edges of the cutter blade by analyzing the images of the cutting edges of the cutter blade that are captured by the camera, and then controlling one specific light-emitting device to emit light.

Preferably, the light source comprises a holder base holding the light-emitting devices therein. The holder base comprises an opening cut through opposing top and bottom surfaces thereof. The light-emitting devices are mounted in the holder base, and equiangularly spaced around the opening. The camera is disposed above the holder base to face toward the opening of the holder base.

Preferably, the detection system further comprises a sensor electrically connected to the camera. When the detection system detects the cutter edges of the cutter blade of the cutter, it runs subject to the following steps (a) enabling the controller to drive all light-emitting devices to emit light onto the cutter blade of the cutter, and then enabling the camera to capture the images of the cutter blade of the cutter and to transmit the captured images to the controller, (b) enabling the controller to figure out the angle of the cutter blade of the cutter by analyzing the images provided by the camera, and then to drive on at least one light-emitting device to emit light according to the angle of the cutter blade, and (c) enabling the camera to capture the picture of the cutter blade and to transmit the captured picture to the sensor for detection.

BRIEF DESCRIPTION OF THE DRAWINGS

FIG. 5 is an operational flow of the detection system in accordance with the present invention.

DETAILED DESCRIPTION OF THE PREFERRED EMBODIMENT

Figure 1:
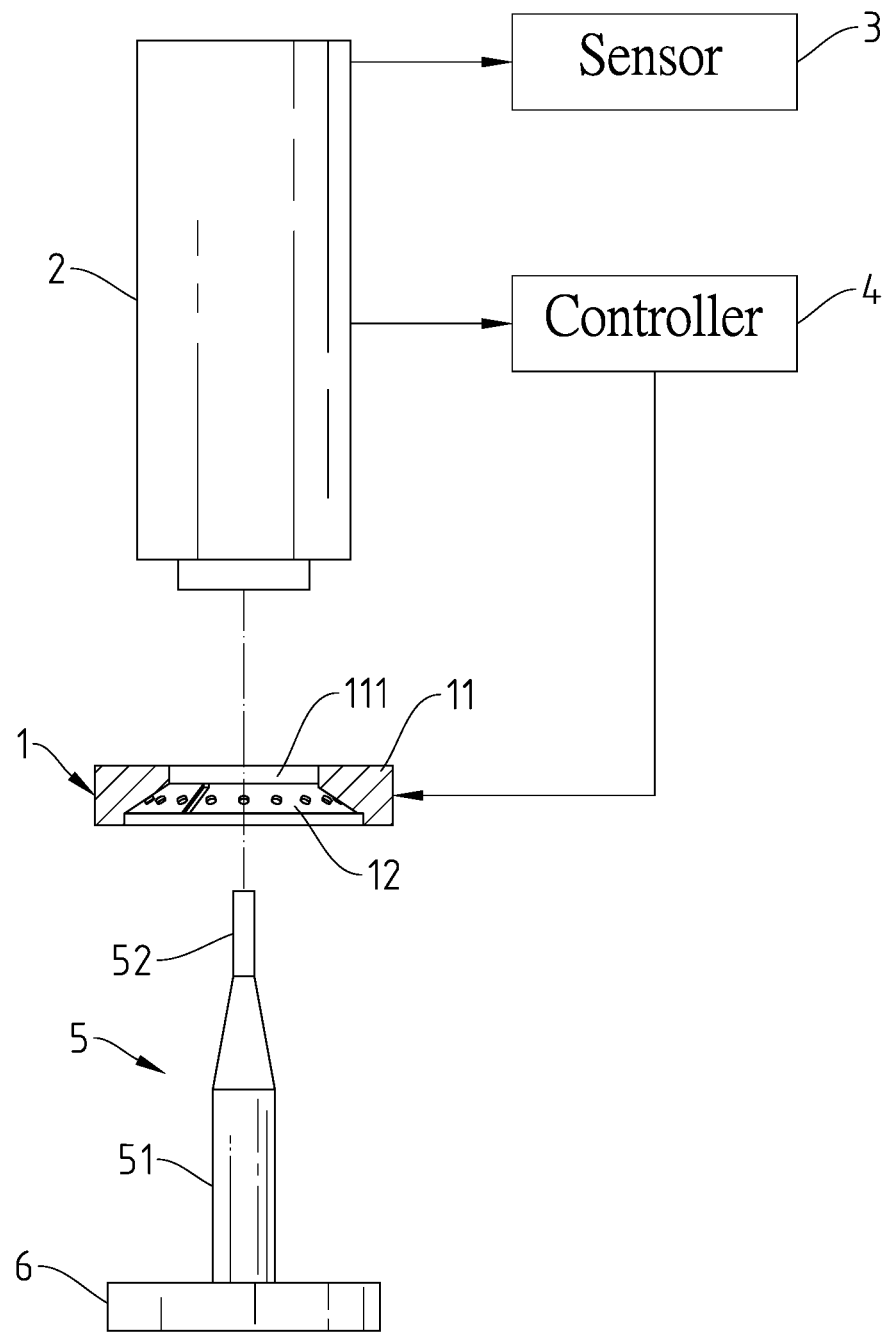
FIG. 1 is a schematic drawing illustrating a detection system in accordance with the present invention.
Figure 2:
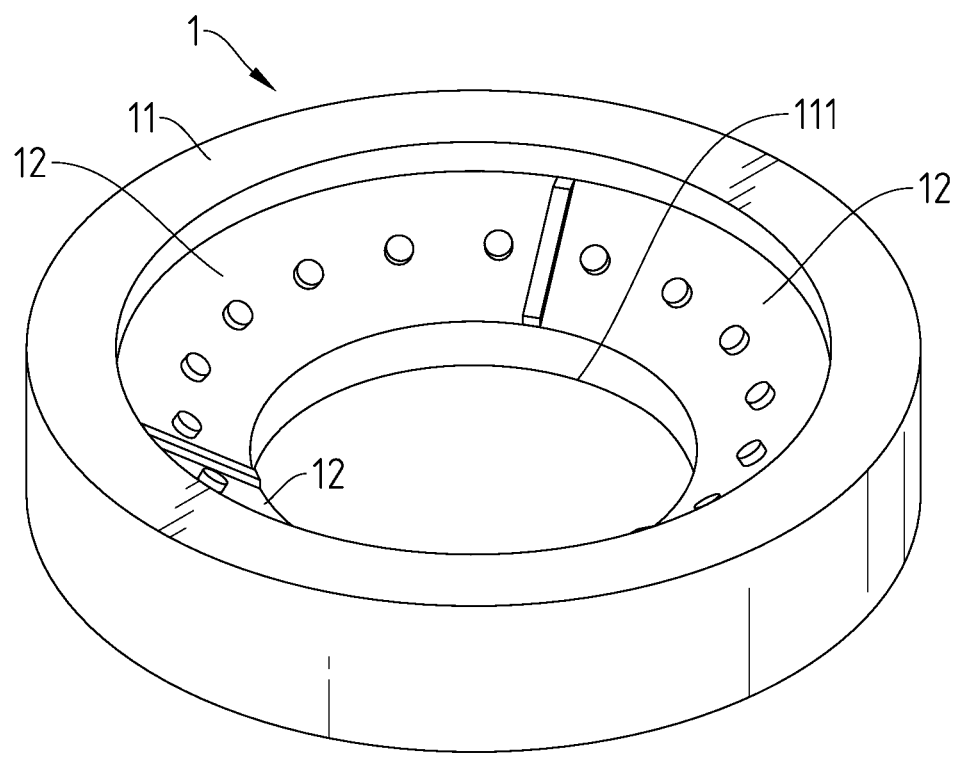
FIG. 2 is an oblique top elevational view of the light source of the detection system in accordance with the present invention.
Figure 3:
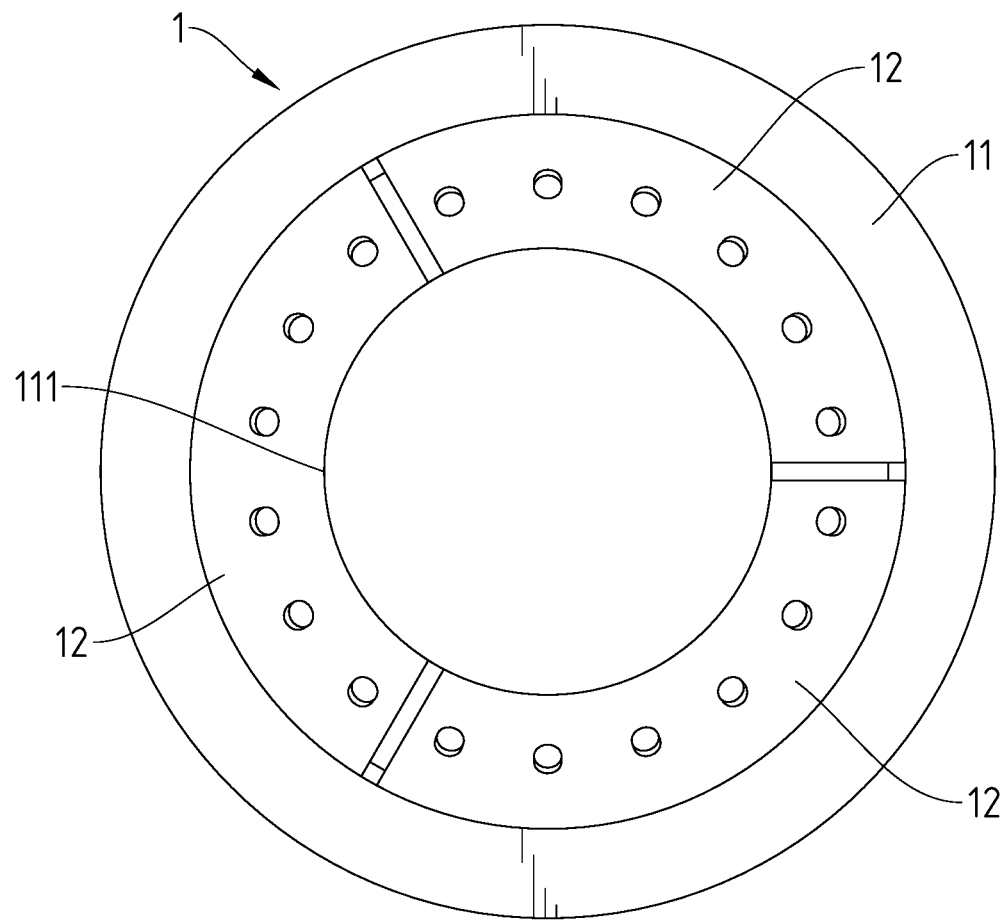
FIG. 3 is a bottom view of the light source shown in FIG. 2.

Referring to FIGS. 1-3, a detection system in accordance with the present invention is shown. The detection system comprises a light source 1, a camera 2, a sensor 3 and a controller 4.

The light source 1 and the camera 2 are electrically coupled to the controller 4. The sensor 3 is electrically coupled to the camera 2. The light source 1 comprises a holder base 11, and at least three light-emitting devices 12. The holder base 11 has an opening 111 cut through opposing top and bottom surfaces thereof. The light-emitting devices 12 are mounted in the holder base 11 and equiangularly spaced around the opening 111. Further, the camera 2 is disposed above the holder base 11 of the light source 1 and facing toward the opening 111 of the holder base 11. Further, a cutter holder 6 is disposed at a bottom side relative to the opening 111 of the light source 1 for holding a cutter 5.

Figure 4:
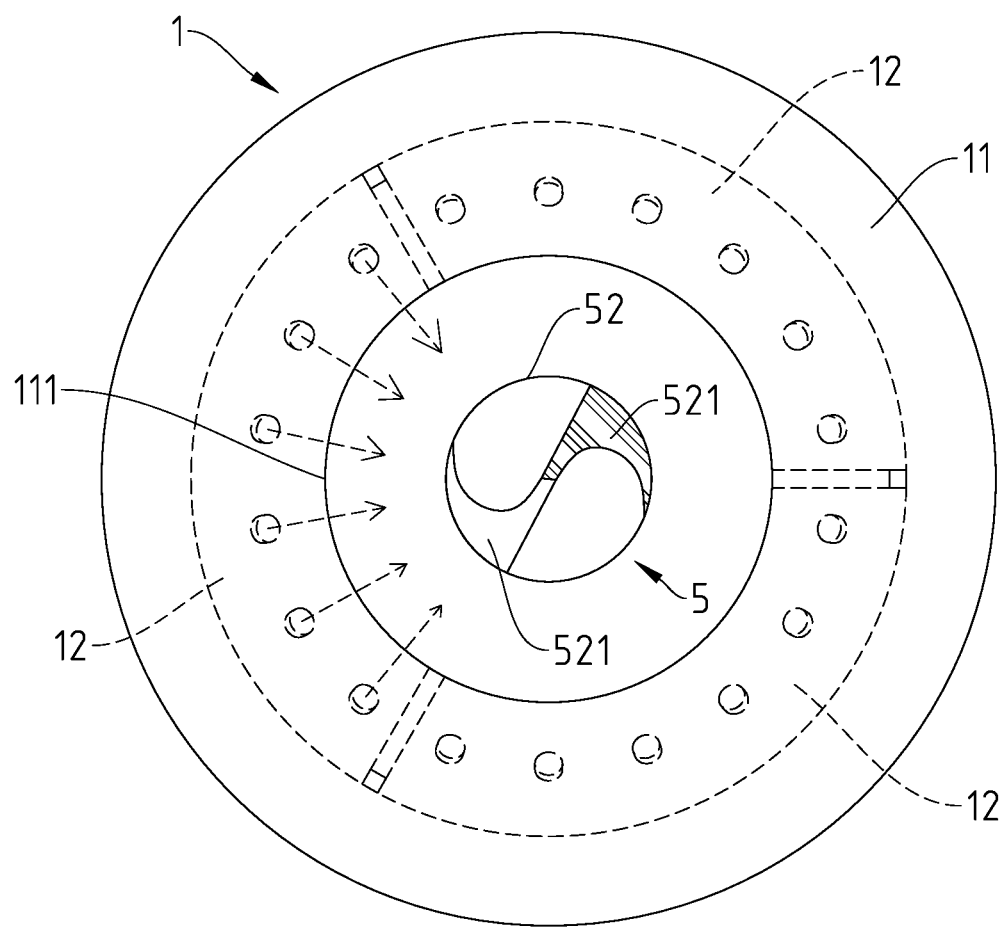
FIG. 4 is a schematic drawing illustrating the light-emitting devices emitted light toward the butter blade of the cutter.

Referring to FIGS. 4 and 5 and FIG. 1 again, in application, the detection system is operated according to the steps described hereinafter:

(100): Place the handle 51 of the cutter 5 in the cutter holder 6 to keep the cutter blade 52 of the cutter 5 in alignment with the opening 111 of the light source 1 so that the multiple cutting edges 521 of the cutter blade 52 of the cutter 5 can face toward the light-emitting devices 12.

(101): Enable the controller 4 to drive light-emitting devices 12 and the camera 2 in a proper order, causing the light-emitting devices 12 to emit light onto the cutting edges 521 of the cutter blade 52 of the cutter 5 and the camera 2 to capture the images of the cutting edges 521 of the cutter blade 52 of the cutter 5 and to transmit the captured images to the controller 4.

(102): Enable the controller 4 to figure out the angle of the cutter blade 52 by analyzing the images received from the camera 2 and then controlling the light-emitting devices 12 to emit light, where the angle of cutter blade 52 is an angle relative to one specific light-emitting device 12, i.e., the controller 4 figures out which light-emitting device 12 is disposed closest to the cutting edges 521 by analyzing the received images, and then enables the light-emitting device 12.

(103): Enable the camera 2 to take the picture of the cutter blade 52 again and to transmit the captured picture to the sensor 3 for inspection.

In conclusion, the invention has the features and effects as follows:

1. The invention uses the light-emitting devices 12 of the light source 1 to emit light onto the cutting edges 521 of the cutter blade 52 of the cutter 5, making the cutting edges 521 bright and dark so that when the sensor 3 detects the picture of the cutter blade 52, it can accurately detect the contour of each cutting edge 521.

2. The invention utilizes the controller 4 to figure out which light-emitting device 12 is disposed closest to the cutting edges 521, thus, when positioning the cutter 5, it is not necessary to adjust the angle of the cutter 5.

What is claimed is:

1. A detection system, comprising:
a light source adapted for emitting light onto multiple cutting edges of a cutter blade of a cutter,
a camera adapted for capturing images of said cutting edges,
a controller electrically coupled with said light source and said camera, and
a sensor electrically connected to said camera,
wherein:
said light source comprises at least three equiangularly spaced light-emitting devices;
said controller is capable of determining an angle of said cutting edges of said cutter blade by analyzing the images of said cutting edges of said cutter blade that are captured by said camera, and then controlling one specific said light-emitting device to emit light; and
wherein when the detection system detects said cutter edges of said cutter blade of said cutter, the detection system runs subject to the following steps:
(A) enabling said controller to drive all said light-emitting devices to emit light onto said cutter blade of said cutter, and then enabling said camera to capture the images of said cutter blade of said cutter and to transmit the captured images to said controller;
(B) enabling said controller to determine the angle of said cutter blade of said cutter by analyzing the images provided by said camera, and then to drive at least one said light-emitting device to emit light according to the angle of said cutter blade; and
(C) enabling said camera to capture a picture of said cutter blade and to transmit the captured picture to said sensor for detection.

2. The detection system as claimed in claim 1, wherein said light source comprises a holder base holding said light-emitting devices therein, said holder base comprising an opening disposed through opposing top and bottom surfaces thereof; said light-emitting devices are mounted in said holder base and equiangularly spaced around said opening; and said camera is disposed above said holder base to face toward said opening of said holder base.

* * * * *